United States Patent [19]

Haugk

[11] 4,441,381

[45] Apr. 10, 1984

[54] LOCKING AND POSITIONING APPARATUS FOR RECLINING SEATS

[75] Inventor: Charles A. Haugk, Fort Wayne, Ind.

[73] Assignee: General Engineering & Manufacturing Corp., Andrews, Ind.

[21] Appl. No.: 431,391

[22] Filed: Sep. 30, 1982

[51] Int. Cl.³ .................. G05G 5/06; B60N 1/02
[52] U.S. Cl. ...................................... 74/531; 297/375
[58] Field of Search ................ 74/531; 297/375, 374; 248/410; 188/67

[56] References Cited

U.S. PATENT DOCUMENTS

| | | | |
|---|---|---|---|
| 1,080,714 | 12/1913 | Meyrose | 297/375 |
| 1,747,505 | 2/1930 | Emmert | 248/410 |
| 2,341,465 | 2/1944 | Monnot | 74/531 |
| 2,595,240 | 5/1952 | Glick et al. | 155/163 OR |
| 2,662,585 | 12/1953 | Ozenne | 155/165 OR |
| 2,890,596 | 6/1959 | Hatchett | 74/531 |
| 3,271,071 | 9/1966 | Tabor | 297/375 |
| 3,383,135 | 5/1968 | Posh | 297/355 |
| 3,419,307 | 12/1968 | Strobush | 297/375 |
| 3,893,730 | 7/1975 | Homier et al. | 297/375 |
| 4,372,612 | 2/1983 | Wiers et al. | 297/374 |
| 4,387,926 | 6/1983 | Van Eerden et al. | 188/67 |

FOREIGN PATENT DOCUMENTS

| | | | |
|---|---|---|---|
| 1466417 | 12/1966 | France | 297/375 |
| 564013 | 9/1944 | United Kingdom | 74/531 |

*Primary Examiner*—Lawrence J. Staab
*Assistant Examiner*—Anthony W. Raskob, Jr.
*Attorney, Agent, or Firm*—Fraser, Barker, Purdue & Clemens

[57] ABSTRACT

A locking and positioning apparatus for reclining seats including a back member pivotally connected to a seat member for movement between an upright position and various inclined positions. The locking and positioning apparatus includes first and second telescoping members innerconnected by a pair of gripping elements which are normally biased into frictional gripping engagement with one of the members for preventing relative movement between the members in either direction of travel between the members. A manually actuatable pivotal lever having portions disposed between the pair of gripping elements is provided for releasing the pair of gripping elements from gripping engagement with the one member for preventing relative movement between the members in either direction of travel.

4 Claims, 5 Drawing Figures

LOCKING AND POSITIONING APPARATUS FOR RECLINING SEATS

BACKGROUND OF THE INVENTION

This invention generally relates to reclining seats and, particularly to a novel locking and positioning apparatus capable of retaining the back members of such seats in an infinite number of inclined positions.

Reclining seats are widely used in airplanes, railway cars, automobiles, vans, buses, and the like. Many types of structures for positioning the backs of reclining seats have been produced and examples are illustrated in U.S. Pat. Nos. 2,595,240; 2,662,585; 3,271,071; 3,383,135; 3,893,730 and 3,419,306.

Typically, the structures illustrated in the above-mentioned patents include a pair of elongate members slidably arranged in telescopic relation for movement between extended and retracted positions with respect to each other, and one or more friction washers capable of frictional engagement with one of the members for restraining the associated member against relative movement. The washer arrangement may be moved to an unlocking position, permitting free relative movement between the associated members. The friction washers are normally biased to the locking position, and are typically released by a cam selectively operable to move the washers to the unlocking position against the biasing action of an associated spring. Conventionally, the friction washers are mounted on a fulcrum member, and biased to tilt about the fulcrum member to the locking position. The structure of these prior art devices is typically, rather complex, and costly to produce. Further, these devices have means for locking the telescopic members together in one direction of movement while permitting the members to relative to each other in the opposite direction of movement. Accordingly, these devices lack the necessary structures which are required to satisfy the commercial application of their intended use.

SUMMARY OF THE INVENTION

Briefly, the preferred embodiment of the invention includes a pair of elongate members arranged in telescopic relation for movement in extended and retracted positions relative to each other. An end of one elongate member is pivotally connected to the seat member of a reclining seat and the opposite end of the other associated elongate member is pivotally connected to an arm depending from and affixed to the back member below the pivotal connection of the seat. Gripping means, comprising a pair of spaced friction applying washers, is carried by one of the elongate members and surrounds the other elongate member. The pair of spaced washers, carried on a fulcrum arm extending from one of the elongate members, surrounds the other elongate member and the washers are biased apart to a locked position by a spring or springs to frictionally retain the elongate members in any selective position between extended and retracted positions in each direction of movement. The washers are moved to an unlocked position by members overcoming the action of the spring or springs for permitting free relative movement between the telescoping members.

An object of the invention is to produce a locking and positioning apparatus which utilizes a minimum number of elements and controls movement of telescoping members in both directions.

Another object of the invention is to produce a locking and positioning apparatus which utilizes a pair of friction applying washers which are biased by a spring or springs to assert pressure thereon to instantaneously frictionally engage the telescoping members.

A further object of the invention is to produce a locking and positioning apparatus which utilizes an actuating lever for simultaneously applying compressive pressure to a pair of friction washers for quickly releasing the frictional engagement between the telescoping members.

BRIEF DESCRIPTION OF THE DRAWINGS

The above, as well as other objects of the invention will become readily apparent to one skilled in the art from reading the following detailed description of the preferred embodiments of the invention when considered in the light of the accompanying drawings, in which.

DETAILED DESCRIPTION OF THE PREFERRED EMBODIMENT

Figure 1:
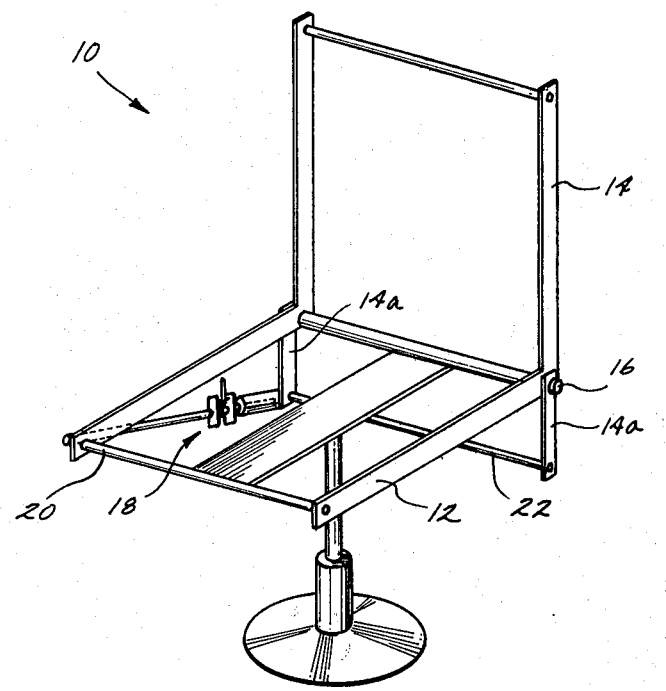
FIG. 1 is a schematic perspective view of a reclining seat assembly incorporating the locking and positioning apparatus constructed in accordance with the invention.

Referring to the drawings, where like reference numerals designate similar parts throughout, there is illustrated in FIG. 1 a reclining seat assembly 10. The seat assembly 10 includes a relatively stationary seat member 12, a back member 14 pivotally connected, as at 16, to the seat member 12, thus allowing the back member 14 to pivot relative to the seat member 12 between an upright position and various inclined positions. A locking and positioning device 18, extending between the front edge of the seat 12 and an arm 14a depending from the back member 14, controls the positioning of the back member with respect to the seat 12. The opposed ends of the locking and positioning device 18 are pivotally connected, as at 20 and 22, to the seat and back members 12 and 14, respectively.

Figure 2:
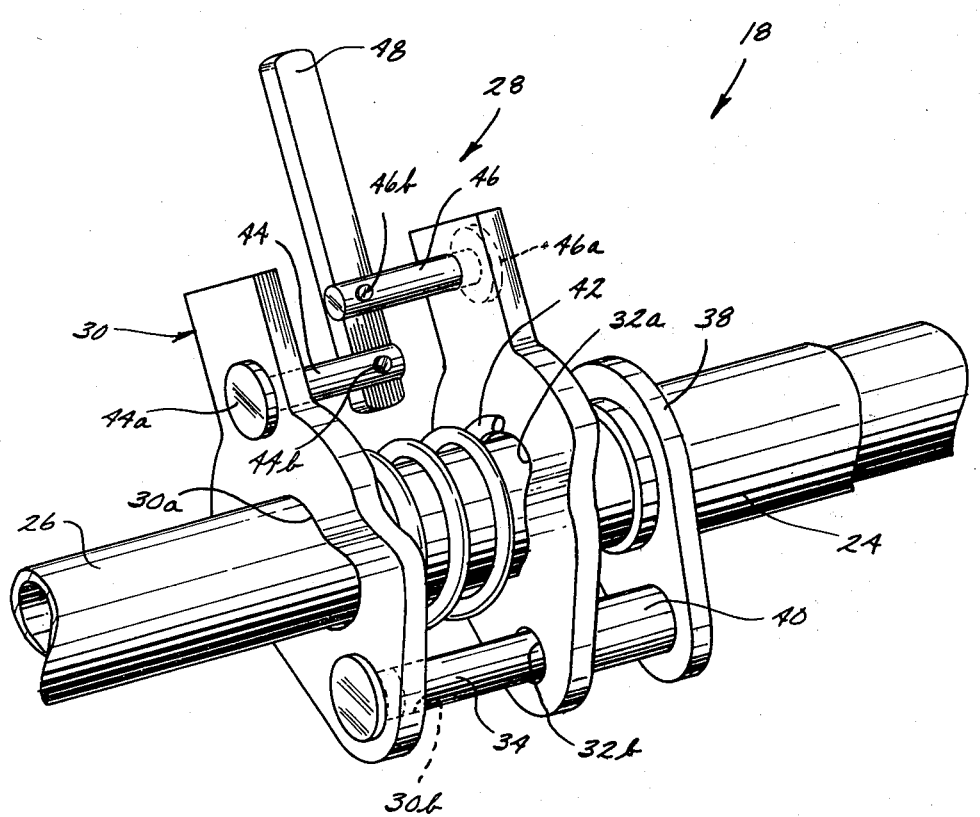
FIG. 2 is an enlarged view of the locking and positioning apparatus illustrated in FIG. 1 in the locked position.
Figure 4:
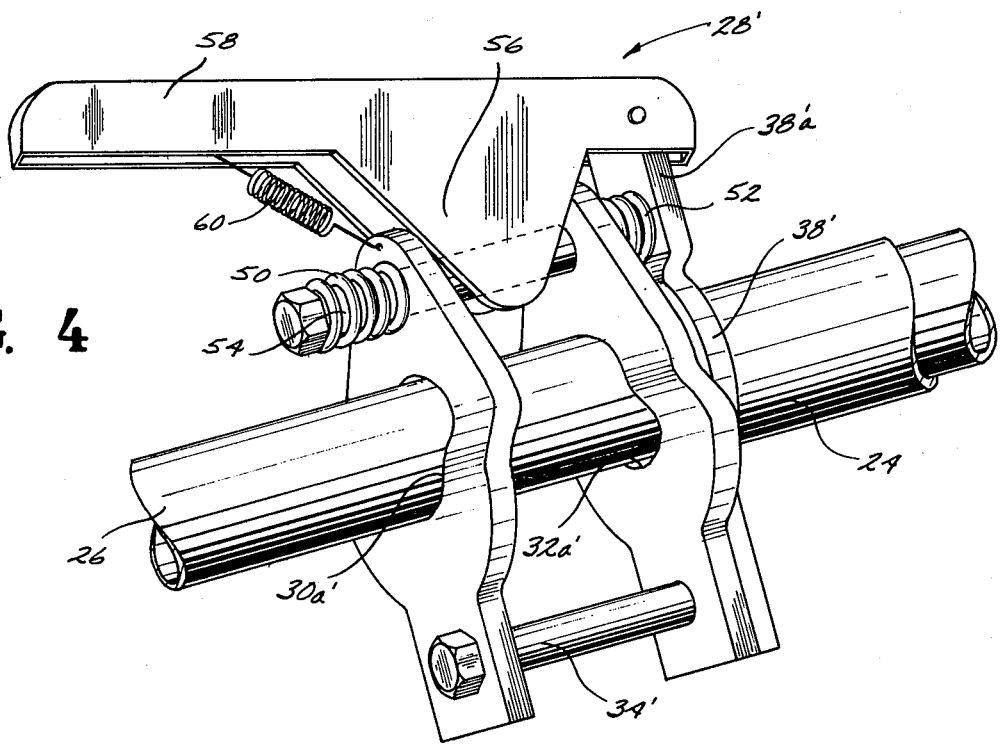
FIG. 4 is an enlarged perspective view of another embodiment of a locking and positioning apparatus constructed in accordance with the invention.

Referring particularly to FIGS. 2 and 4, the locking and positioning device 18 includes first and second elongate tubular members 24 and 26, respectively. As illustrated, the second tubular member 26 is slidably received within the first tubular member 24 for telescoping movement with respect thereto from a retracted position (back member 14 upright) to an extended position (back member 14 inclined).

Carried by the free end of the first tubular member 24 is a gripping means 28 which frictionally grips the second tubular member 26 in selected positions with respect to the tubular member 24. The gripping means 28 is structured to prevent relative telescoping movement between the first and second tubular members 24 and 26 in either direction. To this end, the gripping 28 includes a pair of friction washers 30 and 32 adapted to surround second tubular member 26 and arranged to exert pressure in opposite directions parallel to the second member 26 and in directions opposite to both directions of pivotal movement of the back member 14.

Figure 3:
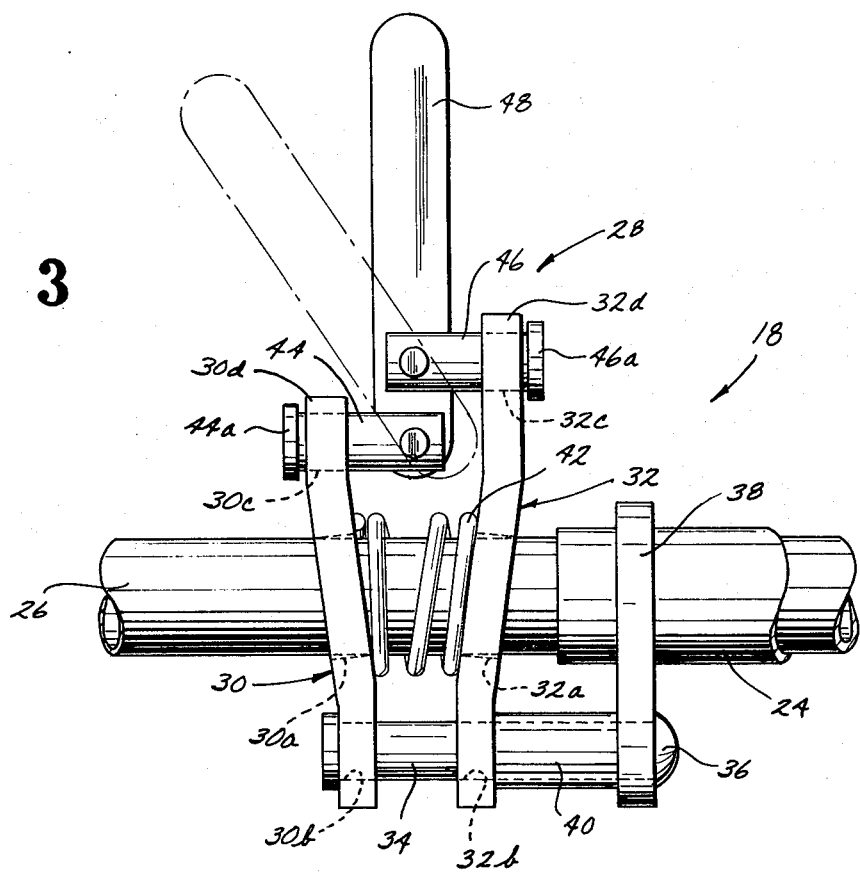
FIG. 3 is an enlarged side elevational view of the apparatus illustrated in FIG. 2.

Referring now to FIGS. 2 and 3, the washers 30 and 32 are generally elliptical in shape and provided with central openings 30a and 32a, respectively, for receiving the second tubular member 26. The openings 30a and 32a are larger than the cross-sectional configuration of the member 26 so as to permit annular movement of the washers 30 and 32 in order to permit the edges of the openings 30a and 32a to engage the outer surface of the second member 26 and prevent movement of the member 26 through washers 30 and 32 to retain the back member 14 in any selected adjusted positions. The washers 30 and 32 are individually carried by a fulcrum arm 34 extending through apertures 30b and 32b provided in the lower end of the washers 30 and 32, respectively. The fulcrum arm 34 may be a headed pin which is attached, as by riveting 36, (see FIG. 3) to a collar 38 secured, as by welding, to the free end of the tubular member 24. The washer 32 is longitudinally spaced from the free end of the member 24 by an elongate tubular spacer member 40 extending between the opposing faces of the washer 32 and collar 38 and surrounding the fulcrum arm 34. In this first position, the washers 30 and 32 are respectively urged into edge gripping engagement by a spring 42 surrounding the member 26 and reacting against the opposing facing surfaces of the washers 30 and 32.

The washers 30 and 32 are compressed into a second release position against the action of spring 42 by headed pin elements 44 and 46, respectively. The pin elements 44 and 46, extend through apertures 30c and 32c parallel to the member 26, are provided with head portions 44a and 46a adapted to act against the outside surfaces of tabs 30d and 32d provided on the upper end of the washers 30 and 32, respectively. The pin elements 44 and 46 are pivotally connected, as at 44b and 46b, in spaced relation relative to an end of the lever 48 for longitudinal movement relative to the member 26. More specifically, the lever 48 projects between the washer tabs 30d and 32d and is adapted for rotary movement about the ends of the pins 44 and 46 for moving the pins longitudinally relative to the member 26. In the gripping position of the washers 30 and 32, the pin elements 44 and 46 allow the washers 30 and 32, respectively, to be tilted into gripping engagement with the sides of the member 26 by the biasing action of the spring 42. In the disengaged position of the washers, the lever 48 is rotatable from the first position to a second position (see dotted line position in FIG. 3) where the pin elements 44 and 46 move the washers toward each other to tilt the washers 30 and 32 and thus releasing the gripping engagement of the openings 30a and 32a from the sides of the tubular member 26.

Figure 5:
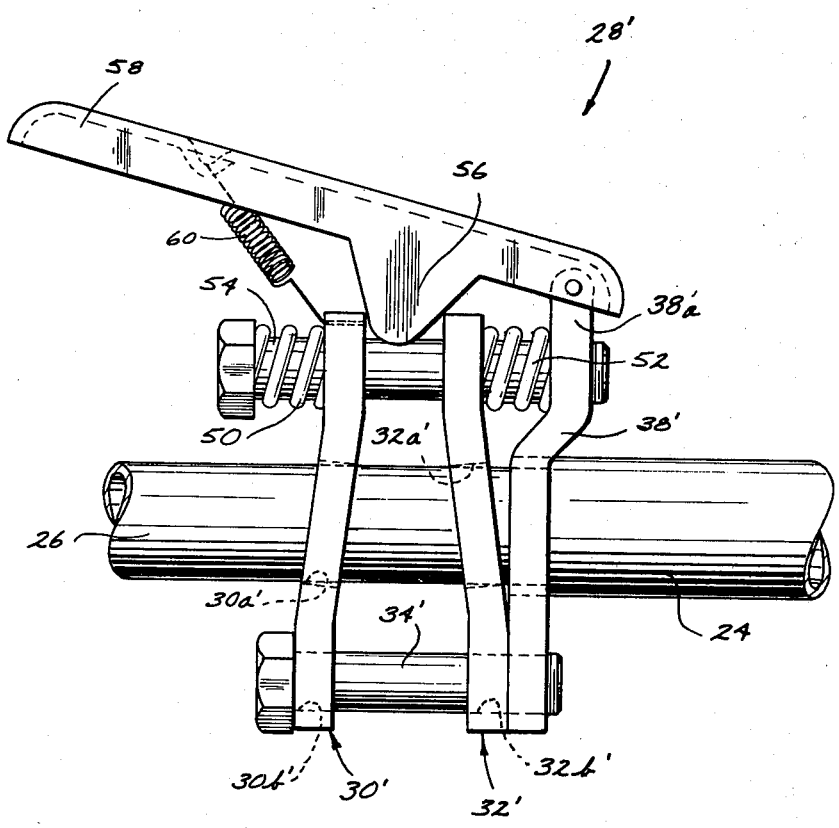
FIG. 5 is an enlarged side elevational view of the apparatus illustrated in FIG. 4.

In the embodiment of the invention illustrated in FIGS. 4 and 5, gripping means 28' includes a pair of friction washers 30' and 32' adapted to surround the second tubular member 26 and arranged to exert pressure in opposite directions parallel to the second member 26 and in directions opposite to both directions of pivotal movement of the back member 14.

The washers 30' and 32' are generally elliptical in shape and provided with a central opening 30a' and 32a', respectively, for receiving the second tubular member 26. The washers 30' and 32' each are carried by a fulcrum arm 34' extending through apertures 30b' and 32b' (see FIG. 5) provided in the lower end of the washers 30' and 32', respectively. The fulcrum arm 34' may be a headed bolt attached in a threaded aperture 36 provided in a collar 38 attached, as by welding, to the free end of the tubular end member 24. In this first position, the washers 30' and 32' are respectively urged into edge gripping engagement by springs 50 and 52, respectively, adapted to react against the outer surfaces of the washers 30' and 32'. More specifically, a headed bolt 54, extending through apertures 30c' and 32c', is attached in a threaded aperture provided in a tab 38a' projecting from the collar 38'. The springs 50 and 52 surround the shank of the bolt with the spring 50 extending between the head of the bolt 54 and the outer surface of the washer 30' and the spring 52 extending between the opposing surfaces of the washer 32' and the collar tab 38a'.

The washers 30' and 32' are moved into a second release position against the action of the springs 50 and 52 by camming means 56. The camming means 56 are provided on a lever arm 58 pivotally connected at one end to the collar 38a'. The camming means 56 is adapted to act against the inside surfaces of the tabs 30d' and 32d' provided on the upper ends of the washers 30' and 32', respectively, for compressing the ends of the washers against their respective springs. In the gripping position of the washers 30' and 32', the cam means 56 allows the washers 30' and 32' to be tilted into gripping engagement with sides of the member 26 by the biasing action of the springs 50 and 52. In the disengaged position of the washers, the lever 58 is rotatable from the first position to a second position (see FIG. 5) wherein the camming means 56 is effective to move the washers away from each other to tilt the washers 30' and 32' to release the gripping engagement of the openings 30a' and 32a' from the sides of the tubular member 26.

In operation, the back member, when released, may be adjusted to an inclined position by moving the actuating lever into the second position, thus releasing the washers from gripping engagement as illustrated in FIGS. 2 and 4. When the desired position of the back 14 has been obtained the actuating lever is released and the member 26 is again gripped by the washers to hold the back member 14 in the exact position to which it has been moved. The back member 14 may be positioned from an upright position, as illustrated in FIG. 1, to a substantially horizontal position, or an infinite number of positions therebetween.

It will be appreciated from the foregoing description that the locking and positioning device 18 controls movement in both directions of travel of the telescoping tubular members relative to each other. Also, it should be noted that the biasing spring or springs cooperate with the two washers to exert pressure thereon so that frictional engagement with the member 26 is applied without delay. Further it should be noted that frictional engagement of the two washers with the tubular member 26 is simultaneously released.

In accordance with the provisions of the patent statutes, the principle and mode of operation has been explained and what is considered to represent its preferred embodiment has been illustrated and described. It should, however, be understood that the invention may be practices otherwise than as specifically illustrated and described without departing from the spirit and scope.

I claim:

1. In a locking and positioning apparatus, comprising:
   a. first and second tubular telescoping members adapted for longitudinal movement relative to one another;
   b. gripping means operatively mounted on said first tubular member and rockable to a first position in frictional gripping engagement with said second tubular member for militating against relative longitudinal movement between said first and said second tubular members and to a second position for allowing relative longitudinal movement between said first and said second tubular members, said gripping means including a pair of gripping members adapted to be rocked away from each other for frictionally gripping said second tubular member in the first position, each said gripping member comprising a washer having a portion engageable with said second tubular member;
   c. means operatively associated with said pair of gripping members for rocking said pair of members into the first position, said means comprising a spring surrounding said second tubular member and operatively disposed between said washers whereby the portions of said washers grip said second tubular member in the first position; and
   d. lever means operatively associated with said pair of gripping members for rocking said pair of gripping members from the first position to the second position for releasing said second tubular member from said first tubular member, said lever means comprising a lever having an end disposed between said washers and a pair of cooperating pins, one of said pins being operatively associated with one of said washers and pivotally connected to the end of said lever and the other said pins being operatively associated with the other said washer and pivotally connected to the end of said lever in a longitudinally spaced relation to the first mention pivotal connection whereby said second tubular member may be positioned and retained in various extended telescope positions relative to said first tubular member.

2. In a locking and positioning apparatus, comprising:
   a. first and second tubular telescoping members adapted for longitudinal movement relative to one another;
   b. gripping means operatively mounted on said first tubular member and rockable to a first position in frictional gripping engagement with said second tubular member for militating against relative longitudinal movement between said first and said second tubular movements and to a second position for allowing relative longitudinal movement between said first and second tubular members, said gripping means including a pair of gripping members adapted to be rocked into engagement with said second tubular member for frictionally gripping said second tubular member in the first position, each said gripping member comprises a washer having a portion engagable with said second tubular member;
   c. means for mounting said pair of gripping members on said first tubular member, said means including a collar fixedly secured to said first tubular member and a fulcrum arm secured to and extending from said collar in spaced parallel relationship along one side of said second tubular member, each said gripping member including an aperture through which said fulcrum arm passes;
   d. means operatively associated with said pair of gripping members for rocking said pair of members about said fulcrum arm into the first position, said means comprises a spring surrounding said second tubular member and operatively disposed between said washers whereby portions of said washers are urged into gripping engagement with said second tubular member in the first position; and
   e. lever means located along another side of said second tubular member opposite from said fulcrum arm and operatively associated with said pair of gripping members for rocking said pair of members from the first position to the second position for releasing said second tubular member from said first tubular member whereby said second tubular member may be positioned and retained in any of various extended telescope positions relative to said first tubular member, said lever means comprises a lever having an end disposed between said washers and a pair of cooperating pins, one of said pins being operatively associated with one of said washers and pivotally connected to the end of said lever and the other said pin being operatively associated with the other said washer and pivotally connected to the end of said lever in a longitudinally spaced relation to the first mentioned pivotal connection.

3. In a locking and position apparatus, comprising:
   a. first and second tubular telescoping members adapted for longitudinal movement relative to one another;
   b. gripping means operatively mounted on said first tubular member and rockable to a first position in frictional gripping engagement with said second tubular member for militating against relative longitudinal movement between said first and said second tubular members and to a second position for allowing relative longitudinal movement between said first and second tubular members, said gripping means including a pair of gripping members adapted to be rocked into engagement with said second tubular member for frictionally gripping said second tubular member in the first position, each said gripping member comprises a washer having a portion engagable with said second tubular member;
   c. means for mounting said pair of washers on said first tubular member, said means including a collar fixedly secured to said first tubular member and a fulcrum arm secured to and extending from said collar and spaced parallel relationship along one side of said second tubular member, each said washer including an aperture through which said fulcrum arm passes;
   d. means operatively associated with said pair of washers for rocking said pair of washers about said fulcrum arm into the first position, said means including a pair of springs with a spring being associated with each said washer for biasing the washers towards each other whereby portions of each said washer grip said second tubular member in the first position, means for mounting said spring on said first tubular member, said means including a member extending from said collar in spaced parallel relation along another side of said second tubular member opposite the side adjacent said fulcrum arm; and e. lever means located against said another side of said second tubular member adjacent said pair of springs and operatively associated with said pair of gripping members for rocking said pair of members from the first position to the second position for releasing said second tubular member from said first tubular member whereby said second tubular member may be positioned and retained in any of various extended telescope positions relative to said first tubular member, said lever means comprises a lever pivotally connected to said collar adjacent said means for mounting for said springs, said lever including a camming portion disposed between said pair of washers adjacent the ends of said springs for rocking said washers about said fulcrum arm for releasing said washers from frictional engagement with said second tubular member in the second position.

4. The invention defined in claim 3 including spring means located between said lever and one of said washers and means for connecting said spring means to said lever and said one of said washers for maintaining the camming portion of said lever in engagement with each said washer.

* * * * *